United States Patent [19]
Easley et al.

[11] Patent Number: 5,361,305
[45] Date of Patent: Nov. 1, 1994

[54] AUTOMATED SYSTEM AND METHOD FOR AUTOMOTIVE AUDIO TEST

[75] Inventors: J. Alexander Easley, Kokomo, Ind.; Randall R. Herkness, Livonia, Mich.; Paul J. Dobosz, McAllen, Tex.; Lisa A. Stacey, Royal Oak, Mich.; Larry W. Soutar, Kokomo, Ind.

[73] Assignee: Delco Electronics Corporation, Kokomo, Ind.

[21] Appl. No.: 150,292

[22] Filed: Nov. 12, 1993

[51] Int. Cl.$^5$ .................. H04R 29/00; H04B 1/00
[52] U.S. Cl. ........................... 381/58; 381/59; 381/86; 455/67.2; 455/66; 455/99
[58] Field of Search ............... 340/514, 515; 455/67.2, 455/66, 99; 381/58, 59, 86, 103

[56] References Cited
U.S. PATENT DOCUMENTS

| | | | |
|---|---|---|---|
| 4,603,325 | 7/1986 | Marino et al. | 340/514 |
| 4,743,887 | 5/1988 | Pothier | 340/531 |
| 5,042,070 | 8/1991 | Linna et al. | 381/59 |
| 5,108,335 | 4/1992 | Carey et al. | 381/86 |
| 5,164,703 | 11/1992 | Rickman | 340/514 |

Primary Examiner—Forester W. Isen
Attorney, Agent, or Firm—Jimmy L. Funke

[57] ABSTRACT

A vehicle audio system is tested during vehicle assembly by a computer controlled system coupled to a vehicle data bus via a diagnostic connector. Radio settings are controlled via the data bus. RF signals bearing preset tones are generated according to computer command via an encoder and RF generator and coupled to the audio antenna base. A microphone in the vehicle detects tones from the speakers and a decoder analyzes the tones to determine whether a tone is correct. Certain speakers are selected for test by adjustment of Fade and Balance controls to check speaker connections. AM and FM SEEK function are checked to verify radio circuits and antenna connections.

10 Claims, 4 Drawing Sheets

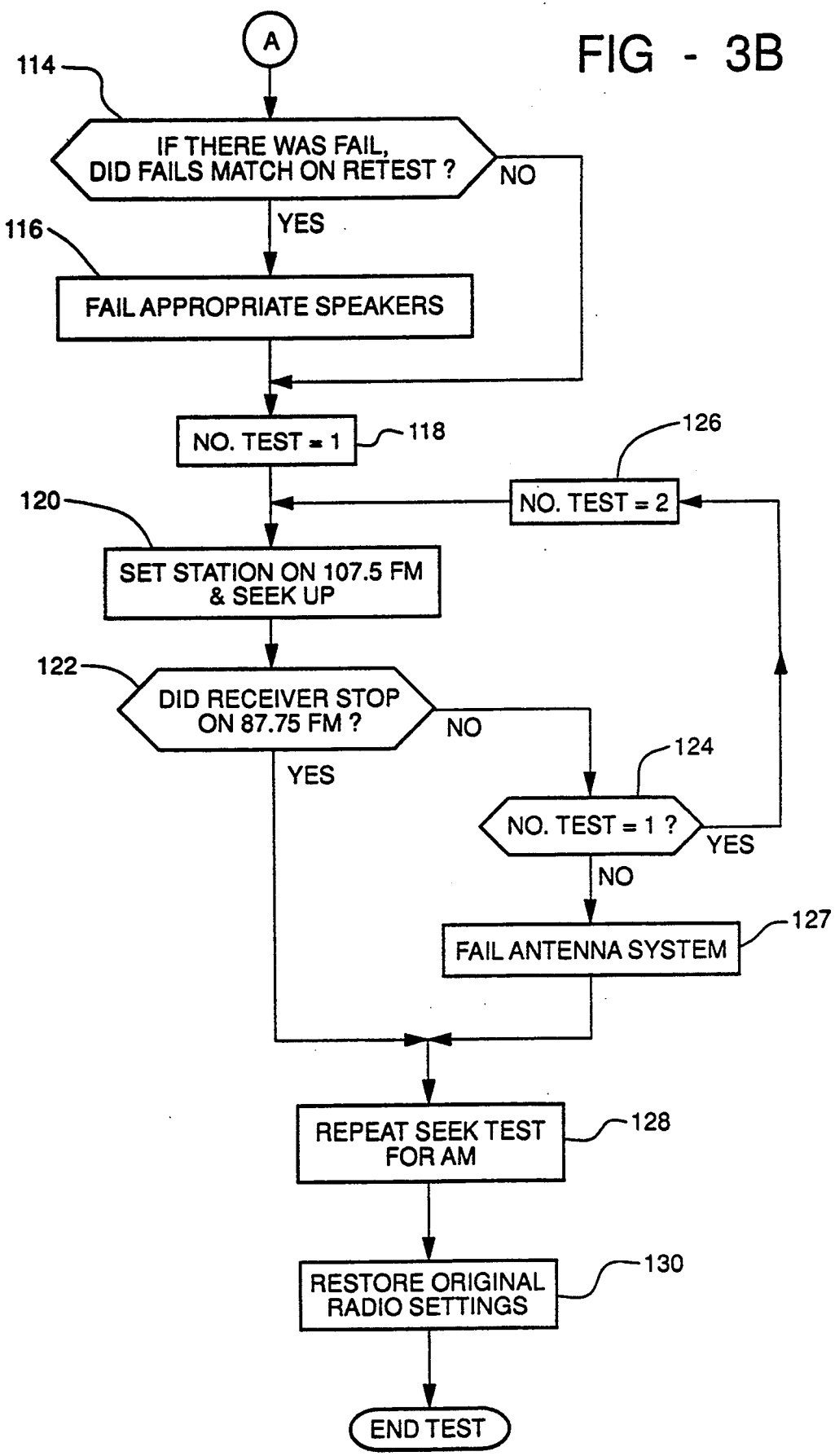

AUTOMATED SYSTEM AND METHOD FOR AUTOMOTIVE AUDIO TEST

FIELD OF THE INVENTION

This invention relates to automotive audio testing and particularly to an automated system and method for verifying the correct installation and proper functioning of an audio system in a vehicle.

BACKGROUND OF THE INVENTION

Installation of an audio system in an automotive vehicle during vehicle assembly requires installing all the audio parts which comprise the radio (receiver), speakers, harnesses associated with the speakers, and antenna components and entails making all the correct connections. Upon completion of installation, it is customary to inspect the system by an operator who manually tunes the radio to a commercial station, tries various audio functions, and listens to each of the speakers to verify that the installation is correct. This inspection is subject to human errors since the operator may forget to perform some of the desired functions or make other mistakes. Typically such an operation is limited to testing on FM stations since AM is typically not received inside metal factory buildings.

Some vehicles are equipped with a data bus coupled to an assembly line diagnostic link connector. Dynamic vehicle tests are performed on the assembly line to characterize vehicle dynamic performance. The tests are performed under computer control utilizing the diagnostic line connector for coupling to the vehicle's computer. It is desirable to incorporate audio testing with the dynamic vehicle tests using either the same computer or a separate computer for controlling the audio tests. It is also desirable to accomplish the audio tests without extending the time required for the dynamic tests.

SUMMARY OF THE INVENTION

It is therefore an object of the invention to automatically test proper functioning of the audio system upon assembly without manual intervention. Another object is to successfully perform such tests in a noisy environment.

The invention is applicable to an audio system which is coupled to a vehicle data bus wherein the data bus is accessible for coupling to an external controller. An automated test in an assembly plant verifies that the completed motor vehicle's audio system is properly connected and fully functional. The test system is fully automatic and utilizes vehicle data bus commands to control the audio system and monitor its response to radio frequency (RF) test signals in the presence of high ambient noise conditions. Preferably the test is done concurrently with the dynamic vehicle test without driver intervention or increase on vehicle test cycle time.

The test checks all speakers and associated harness for proper connection and function, all antenna connections and cables for proper connection and function, AM, FM and audio sections of the radio for proper connection and function, and the receivers Seek function in both AM and FM. The entire test can be accomplished in under 30 seconds.

The test apparatus includes a computer, either the vehicle dynamic test computer or a stand alone computer, coupled to the vehicle's data bus connection, an encoder and RF generator for supplying a desired transmission as controlled by the computer, and a microphone and decoder for detecting speaker response and verifying that the response is correct. The computer exercises audio control functions and monitors test results through a carefully controlled radiation pattern modulated by an encoded test signal, is used to provide an RF test signal in close proximity to the vehicle antenna base. The coupling method employed requires neither direct connection to the antenna base nor installation of an antenna mast. RF radiation is confined to a small area comprising approximately one or two feet surrounding the coupling probe.

The test sequence includes exercising AM and FM Seek function to attempt to find the generated RF test signals. This test will insure the integrity of the cabling and antenna connections. The sequence also includes setting the Fade and Balance to select and positively identify each speaker individually for left front (LF), left rear (LR), right front (RF), and right rear (RR) locations. Also where each location contains speakers for different frequency ranges, the speaker test sequence is repeated for each frequency range, using a test tone appropriate for each range. If any of the tests identify a problem, a fail code is generated. The vehicle is then required to be repaired and successfully retested.

BRIEF DESCRIPTION OF THE DRAWINGS

The above and other advantages of the invention will become more apparent from the following description taken in conjunction with the accompanying drawings wherein like references refer to like parts and wherein:

FIGS. 3a and 3b together comprise a flow chart representing a program for the operation of the computer of FIG. 1.

DESCRIPTION OF THE INVENTION

Figure 1:
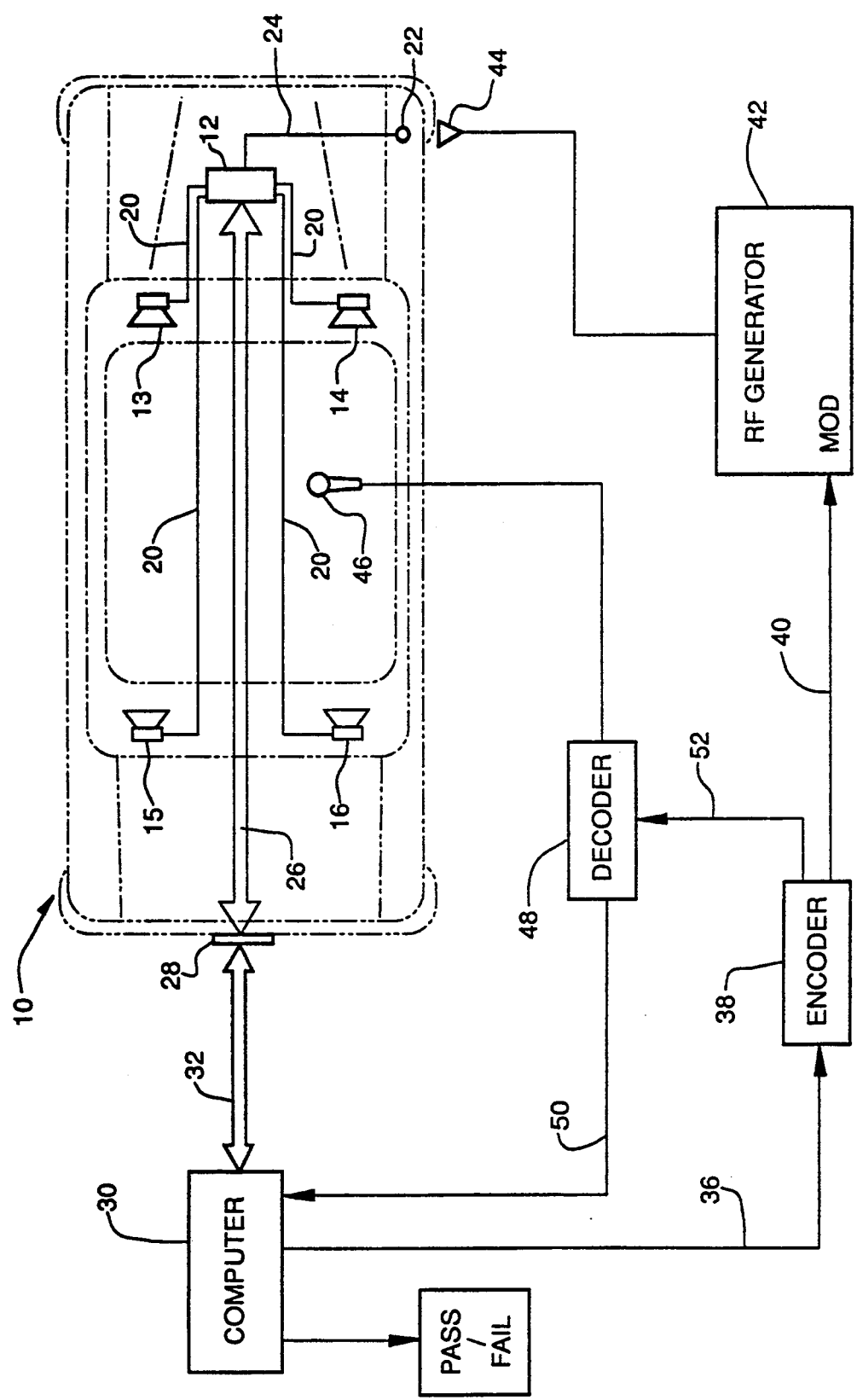
FIG. 1 is a diagram of the system for testing a vehicle audio system according to the invention.

FIG. 1 shows an automotive vehicle 10 equipped with an AM/FM radio 12 coupled to a left and right front speakers 13 and 14, and left and right rear speakers 15 and 16 by a speaker harness 20. An antenna base 22 is connected to the radio 12 by a cable 24. The radio has data bus communication capability and is connected to a vehicle data bus 26 which is supplied with an external connector 28. The vehicle is positioned at a test station on an assembly line, preferably at a dynamic vehicle test station so that audio verification can be performed during the dynamic test. An antenna may be installed on the antenna base 22 but it is not required for the test.

The audio system test apparatus at the test station includes a computer 30 or microprocessor controller which may be the same computer which controls the dynamic vehicle test or a separate computer. It has a data bus 32 operated through an RS-232 link which is coupled to the data bus 26 via the connector 28. A serial link 36 carries a command from the computer 30 to an encoder 38 which develops a modulate signal in response to the command. A line 40 carries the modulated signal to the modulation input of an RF generator 42. The RF generator produces an AM or FM signal carrying the modulated signal. The RF signal is applied to a transmitting antenna 44 or coupler which is stationed close to the antenna base 22 on the vehicle. The radiated signal is confined to a small area so that it is effective only to transmit to the antenna base. A microphone 46 is positioned inside the vehicle to sense output from any of the speakers. The microphone output is fed to a decoder 48 (which may also be within the vehicle) and the decoder is effective to digitize the result of each test and feed the digital result to the computer 30 via a line 50. The decoder receives a control signal on line 52 from the encoder 38.

Figure 2:
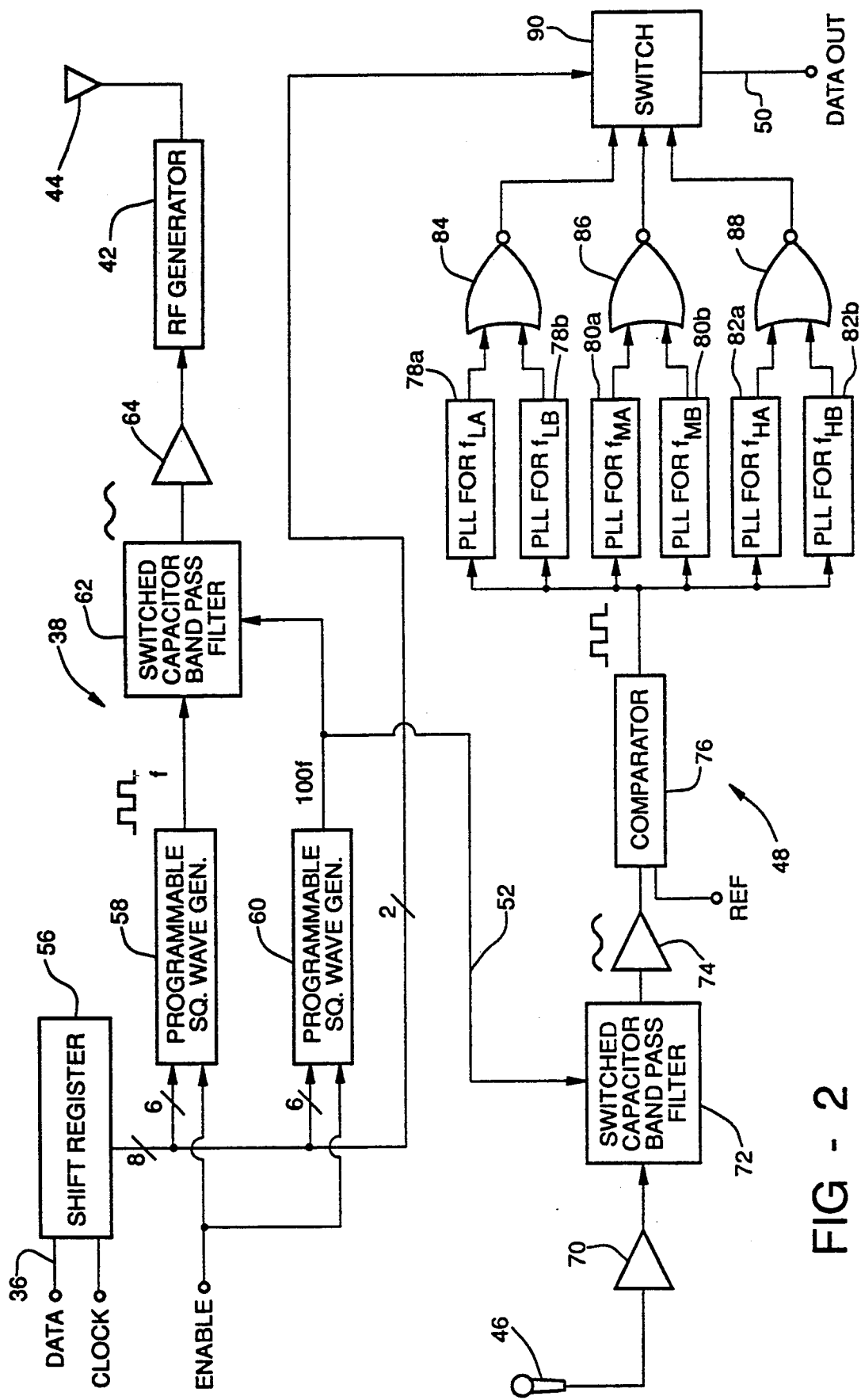
FIG. 2 is a circuit diagram for the encoder and decoder of the system of FIG. 1.

As shown in FIG. 2, the encoder 38 comprises a shift register 56 receiving serial data in from the computer 30 to convert the data to parallel 8-bit format. Six bits of the data are coupled to programmable square wave generators 58 and 60. The square wave generator 58 puts out a square wave having a frequency f determined by the 6-bit data input, and the square wave generator 60 supplies a signal at 100 f. The generators 58a and 60 are operative only when an enable input from the computer is present. A switched capacitor band pass filter 62 controlled by the 100 f signal receives the f signal from the generator 58 for the purpose of passing the center frequency as a sine wave. An amplifier 64 amplifies the sine wave and feeds it to the modulation input of the RF generator 42 for transmission by the antenna 44 on an AM or FM carrier. Although not shown, the computer may have a connection to the RF generator to select the modulation mode and carrier frequency.

The decoder 48, also shown in FIG. 2, analyzes the microphone 44 output to determine that the proper speaker responds with the correct tone. The microphone output is amplified by amplifier 70 and a second switched capacitor band pass filter 72 which is controlled by the 100 f signal from generator 60 via line 52 passes the same sine wave signal at frequency f which is passed by the filter 62. That signal is amplified by amplifier 74. A comparator 76 receives the sine wave signal from the amplifier 74 on one input and compares it to a fixed reference voltage at another input to generate a square wave signal also of frequency f, assuming that the system is operating correctly. The correct operation is verified by a tone decoder which has an output when the correct tone is received and the correct speaker is energized. For the case of three input tones, for low, midrange and high frequencies, the tone decoder has three pairs of phase locked loop circuits 78a, 78b; 80a, 80b; and 82a, 82b, each of which have a high output in the absence of the detector frequency, and low when the frequency is detected. The outputs of each pair of PLL circuits are coupled to a corresponding NOR gate 84, 86 or 88. Thus each NOR gate will have a high output only when both of its inputs are low, indicating that both related PLL circuits detect the expected frequency.

For example, the PLL circuits 78a and 78b have respective frequencies set at $f_{LA}$ and $f_{LB}$ which are 6% above and 6% below the center frequency of the low tone. The phase locked loop has a 13% capture range, so that if the received tone is within 1% of the low tone both of those circuits will have low outputs and the NOR gate 84 will have a logic high output, indicating that the low frequency tone was detected. Similarly, the PLL circuits 80a and 80b have respective frequencies set at $f_{MA}$ and $f_{MB}$ for midrange tones and PLL circuits 82a and 82b have respective frequencies set at $f_{HA}$ and $f_{HB}$ for high tones. This careful tone verification technique assures accurate testing in a noisy environment.

A switch 90 having a control input comprising a 2-bit line from shift register 56 selects one of the signals from the NOR gates 84, 86, and 88 as dictated by the 2-bit command. If the selected signal is high, then the high output will appear on encoder output line 50 which is coupled back to the computer to confirm that the correct tone was received or, if the selected signal is low, that the correct tone was not received.

Figure 3A:
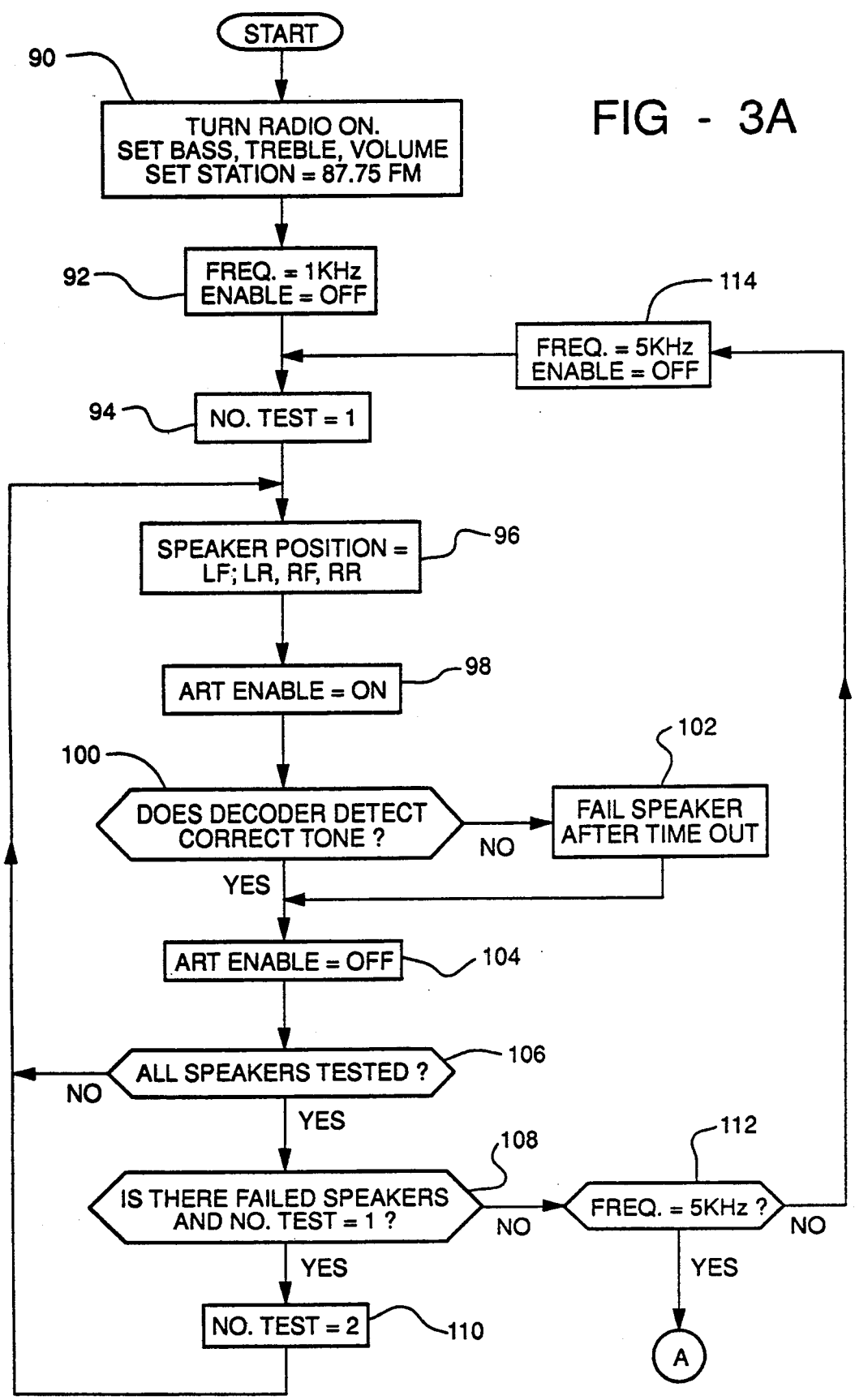

The audio system test procedure is controlled by a program of the computer 30. The flow chart of FIGS. 3a and 3b, coupled at node A, generally represents the program results. The ensuing description of the flow chart refers to numerals in angle brackets <nn> to express the function of the blocks bearing the same numerals. In this example, the test is run for a system having woofers and tweeters and thus employs midrange and high frequencies. First each speaker location is tested at the midrange tone and the tests are repeated for the high tone. It is assumed at the outset that the RF generator is set to produce an FM signal at 87.75 Mhz. First the radio is turned on, the bass and treble are set to midrange, the volume is set to a high value and the station is set to 87.75 MHz <90>. Then the tone frequency is set to 1 kHz for a midrange test, and the enable signal is set to OFF <92> to minimize the production of loud tones when unnecessary. Then the number of tests is set to 1 <94> and a speaker position is selected <96>. Speaker selection is accomplished by setting the Fade and Balance controls to favor the desired speaker. Next the Enable is turned ON <98> to begin the tone and the decoder output is tested to determine whether the tone was received <100>. If the tone is not received within a certain time period, say 0.5 second, the speaker is failed by setting a flag <102>. The enable is turned OFF whether the speaker failed to passed <104>. If all speakers have not been tested, the program returns to block 96 for the selection of another speaker <106>, but if they all are tested, it is determined whether there is a failed speaker AND the number of tests is equal to 1 <108>. This allows a second test of all speakers by setting the number of test to 2 <110> and starting again at block 96. In the event the test was not 1 or there was no failed speaker <108>, the test sequence is repeated for a high tone. This is accomplished by querying whether the tone was set for 5 kHz <112>. If not, the tone frequency is set to 5 kHz and the enable is turned OFF <114>, and the sequence is repeated from block 94. When the high tone test is completed, the block 112 query is true, and the program goes to FIG. 3b. It is determined whether there was a repeat failure <116> which means that due to faulty connections or audio circuit, a repair is required.

Then a test is begun to determine operation of the SEEK mode. The number of test is set to 1 <118>, the station is set to 107.5 MH, and SEEK UP is set <120>. If the receiver stops on the transmitted signal (87.75 MHz) <122>, the system passes, but if not it is retested <124> by resetting the test number to 2 <126> and repeating from block 120. The receiver station setting is determined by querying the radio via the data bus. If the test fails on the second attempt, the antenna system is failed <126> since this is the most likely cause of such failure, although operation of the SEEK function is also in question. The test is repeated for an AM signal <128> which requires, of course, that an AM signal be transmitted by the RF generator and that appropriate frequencies be used in blocks 120 and 122. The radio is finally restored to its original settings <130> and the test is ended. Any failure requires that the audio system be repaired and retested.

It will thus be seen that the audio system is quickly and thoroughly tested under computer control and without operator intervention. Tests can be made on both AM and FM, if desired, to thereby check both AM and FM circuits as well as the audio section of the radio and the antenna and speaker connections. The tests can be made in a noisy factory environment.

The embodiments of the invention in which an exclusive property or privilege is claimed are defined as follows:

1. In a system for testing a vehicle audio system having a radio coupled to speakers, the testing system including a data bus connected to the radio for setting parameters, a microphone in the vehicle responsive to sound from the speakers, a transmitting antenna, and an external computer coupled to the data bus, the microphone and the antenna; a method of testing the audio system comprising the steps of:

transmitting modulated radio signals to the vehicle under computer control;

setting the radio under computer control for response to the signals;

detecting the speaker response; and evaluating the audio operation by analyzing the detected speaker response.

2. The invention as defined in claim 1 wherein:

the transmitting step comprises transmitting a preselected frequency at a given AM/FM mode; and the setting step comprises setting the radio for the preselected frequency and the given mode.

3. The invention as defined in claim 1 wherein:

the transmitting step comprises transmitting a modulated tone; and the setting step includes selecting a speaker for response, whereby detection of the modulated tone verifies that the selected speaker is operably connected to the radio.

4. The invention as defined in claim 1 wherein the setting step includes selecting a speaker for testing and, after detecting the speaker response, sequentially selecting other speakers for testing, whereby each detected response verifies that the currently selected speaker is operably connected to the radio.

5. The invention as defined in claim 1 wherein the parameters set by the data bus include fade and balance controls for adjusting response of various speakers and wherein:

the setting step includes adjusting the fade and balance controls to select a speaker for testing and, after detecting the speaker response, sequentially selecting other speakers for testing by adjusting fade and balance controls, whereby each detected response verifies that the currently selected speaker is operably connected to the radio.

6. The invention as defined in claim 1 wherein the audio system has at least first and second sets of speakers respectively responsive to at least first and second frequency ranges, wherein:

the transmitting step comprises first transmitting a modulated tone in the first frequency range and subsequently transmitting a tone in the second frequency range; and the setting step includes first sequentially selecting speakers for response to the first tone while the first tone is transmitted, and then sequentially selecting speakers for response to the second tone while the second tone is transmitted, whereby detection of the correct tone verifies that a selected speaker is operably connected to the radio.

7. The invention as defined in claim 1 wherein the parameters set by the data bus include a seek function and a frequency selection function, and wherein:

the transmitting step comprises transmitting at a given frequency;

the setting step includes selecting a frequency other than the transmitted frequency and then enabling the seek function, whereby detection of the correct tone verifies the integrity of antenna connections and the operability of the seek function.

8. A system for testing a vehicle audio system having a radio connected to a plurality of speakers and an antenna base wherein the vehicle has a data bus coupled to the radio, the system comprising:

a computer external of the vehicle;

an antenna for transmitting to the radio;

a radio frequency generating means under control of the computer and coupled to the antenna for furnishing modulated signals to be transmitted;

means for coupling the computer to the radio via the data bus for setting the radio to receive the modulated signals and to selectively energize the speakers to emit the modulated signals;

a microphone in the vehicle to detect speaker output; and means for coupling the microphone to the computer for evaluation of the audio operation on the basis of speaker response.

9. The invention as defined in claim 8 wherein:

the radio frequency generating means includes an encoder responsive to digital output of the computer for producing a modulation signal and an RF generator coupled to the encoder for producing an RF signal carrying the modulation signal.

10. The invention as defined in claim 8 wherein:

the radio frequency generating means includes an encoder responsive to digital output of the computer for producing a modulation signal and an rf generator coupled to the encoder for producing an RF signal carrying the modulation signal; and the means for coupling the microphone to the computer includes a decoder responsive to the speaker output and to the digital output of the computer for determining whether the speaker response is correct.

* * * * *